Figure 1:
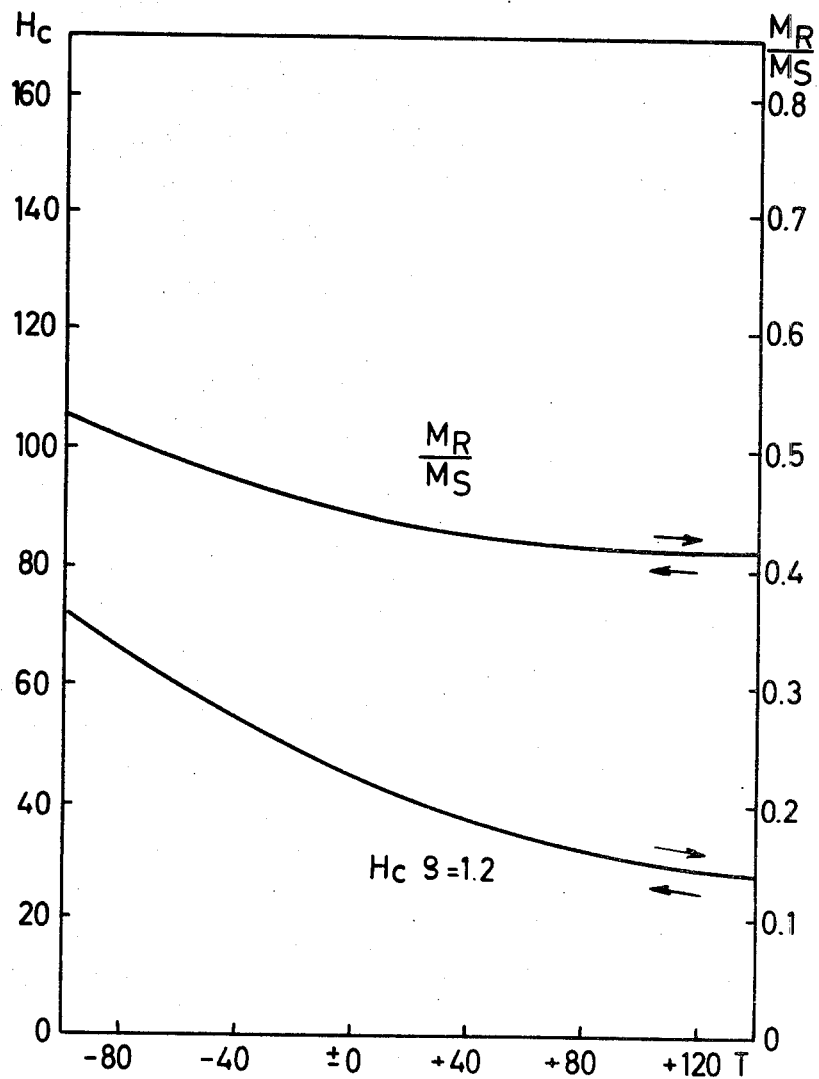
Figure 2:
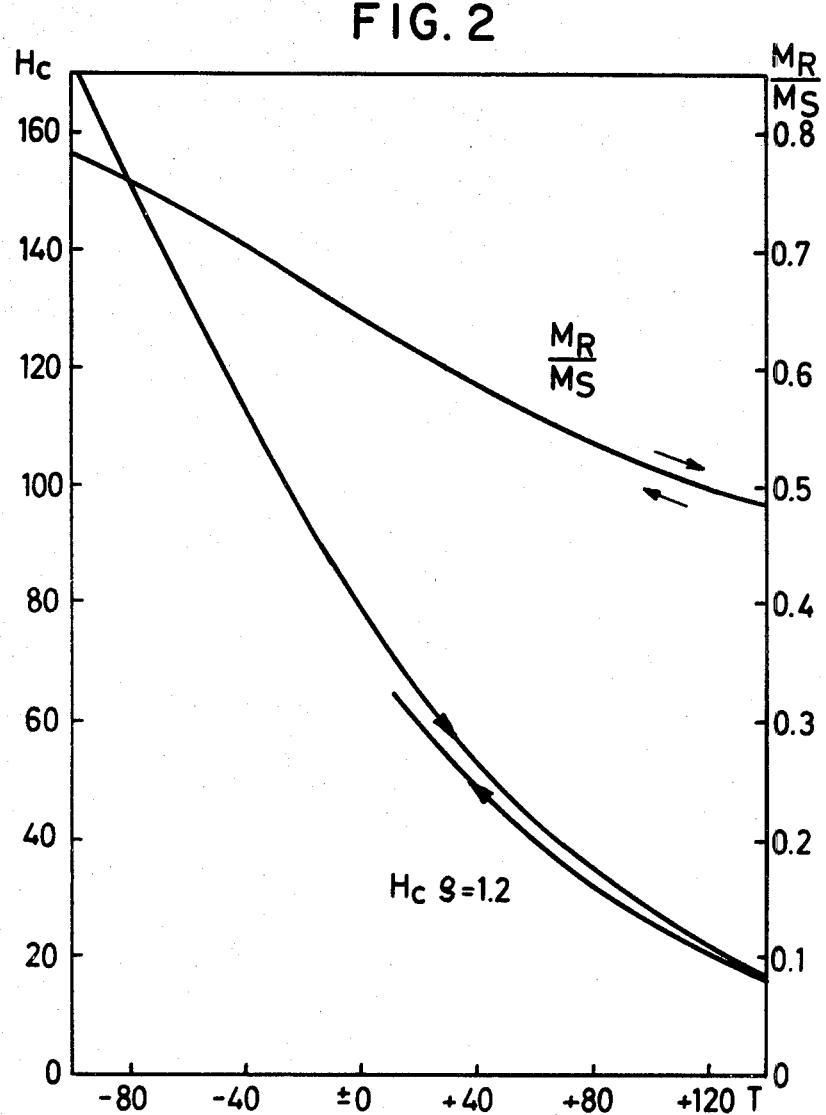
Figure 3:
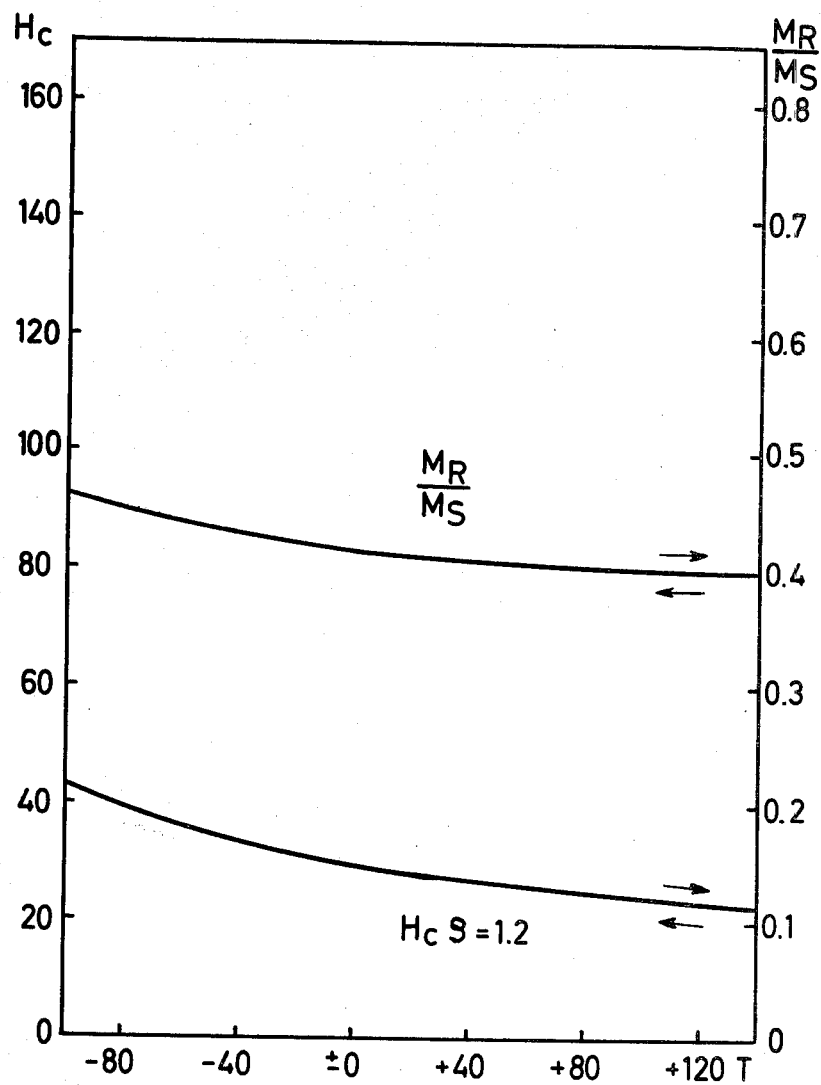

United States Patent [19]

Becker et al.

[11] 4,188,302

[45] Feb. 12, 1980

[54] MANUFACTURE OF ACICULAR COBALT-MODIFIED MAGNETIC IRON OXIDE

[75] Inventors: Hans-Juergen Becker, Goennheim; Christof Jaeckh, Heidelberg; Eberhard Koester, Frankenthal; Werner Loeser, Ludwigshafen; Manfred Ohlinger, Frankenthal; Werner Steck, Mutterstadt, all of Fed. Rep. of Germany

[73] Assignee: BASF Aktiengesellschaft, Ludwigshafen, Fed. Rep. of Germany

[21] Appl. No.: 872,262

[22] Filed: Jan. 25, 1978

[30] Foreign Application Priority Data

Feb. 12, 1977 [DE] Fed. Rep. of Germany ....... 2705967

[51] Int. Cl.$^2$ .............................................. C01G 49/06
[52] U.S. Cl. ................................ 252/62.56; 427/127; 427/215
[58] Field of Search ............................ 252/62.56, 127; 427/128, 130, 215

[56] References Cited

U.S. PATENT DOCUMENTS

| 4,015,030 | 3/1977 | Sasazawa et al. ............. 252/62.56 X |
| 4,066,564 | 1/1978 | Sasazawa et al. ................. 252/62.56 |

FOREIGN PATENT DOCUMENTS

| 2243231 | 3/1974 | Fed. Rep. of Germany ........ 252/62.56 |
| 50-37668 | 4/1975 | Japan ..................................... 252/62.56 |

*Primary Examiner*—Jack Cooper
*Attorney, Agent, or Firm*—Keil & Witherspoon

[57] ABSTRACT

A process for the manufacture of an acicular magnetic iron oxide containing from 0.5 to 10 percent by weight of cobalt and up to 24 percent by weight of divalent iron, each based on the amount of iron(III) oxide, wherein an aqueous suspension of gamma-iron(III) oxide, containing cobalt(II) and iron(II) ions, the suspension having a hydroxyl ion concentration of more than $3.6 \times 10^{-6}$ moles/liter, is heated at from 50° to 100° C. for at least 15 minutes, and the resulting precipitate is filtered off, washed until neutral, dried at below 100° C. and thereafter heated at from 100° to 200° C.

The products thus obtained give, even when their cobalt content is low, a very high coercive force, while the effect of temperature on the coercive force and residual induction is very slight.

2 Claims, 3 Drawing Figures

MANUFACTURE OF ACICULAR COBALT-MODIFIED MAGNETIC IRON OXIDE

The present invention relates to a process for the manufacture of acicular magnetic iron oxides containing from 0.5 to 10 percent by weight of cobalt and up to 24 percent by weight of divalent iron, each based on the amount of iron(III) oxide.

Acicular gamma-iron(III) oxide has for a long time been employed extensively as a magnetizable material for the manufacture of magnetic recording media. However, as a result of continued development in the field of recording technology, there is an increasing need for magnetic materials which, above all, have a higher coercive force than gamma-iron(III) oxide. Although it is known that the coercive force of iron oxides can, under certain circumstances, be increased substantially by modification with cobalt, the increase depending on the amount of cobalt added, such modified materials have a number of undesirable properties, in particular the residual induction and coercive force thereof are unstable to thermal and mechanical factors. Materials which suffer from such disadvantages are unsuitable for use in magnetic recording media.

Cobalt-modified acicular iron oxides are obtainable by a number of processes. According to German Patent Nos. 1,112,725 and 1,226,997, modification with cobalt can be easily achieved by co-precipitation of iron hydroxide and cobalt hydroxide during the manufacture of goethite, since the subsequent conversion of the cobalt-modified goethite to the corresponding gamma-iron(III) oxide is carried out in the conventional manner. German Laid-Open Application DOS No. 2,100,390 employs a similar procedure.

According to German Published Application DAS 2,036,612 it is also possible to precipitate a cobalt compound onto the surface of a gamma-iron(III) oxide. The cobalt is introduced into the iron oxide lattice by subsequent heating at from 380° to 400° C. According to German Laid-Open Application DOS No. 2,243,231, the acicular hydrated iron oxide is provided with a protective coating, prior to the reduction to magnetite, in order to avoid sintering of the acicular particles, and is subjected to a heat treatment after the cobalt compound has been applied to the magnetite or the gamma-iron oxide. A further method of obtaining cobalt-modified acicular iron oxides is disclosed in German Laid-Open Application DOS No. 2,022,013. According to this publication, acicular FeOOH or $Fe_2O_3$ is mixed with a liquid containing a cobalt compound, the slurry is dried and the mass is then either converted to gamma-iron(III) oxide by conventional methods or, if gamma-iron(III) oxide was employed as starting material, is merely sintered. If magnetite is used as the starting material in this process, it must first be oxidized to gamma-iron(III) oxide which is then treated with the cobalt compound.

In the process disclosed in German Published Application DAS 2,221,218, a cobalt-containing goethite or alpha-$Fe_2O_3$ is converted to gamma-iron(III) oxide in the conventional manner, but only after it has first been heated at from 600° to 800° C. According to German Published Application DAS No. 1,907,236, another method of manufacturing cobalt-modified acicular gamma-iron(III) oxide is to suspend gamma-iron(III) oxide itself, or an oxide obtained as an intermediate in its manufacture, in an aqueous medium, precipitate a cobalt compound onto the oxide and heat the product at a temperature which is sufficiently high to decompose the cobalt compound. Preferably, heating is carried out in an inert gas atmosphere at above 370° C. If necessary, such modified iron oxides are then reduced and oxidized, in the conventional manner, to obtain the end product. Partial reduction of the cobalt-modified gamma-iron(III) oxides obtained by this process, in order to increase their coercive force has also been proposed. In addition to these processes, it has also been proposed, in German Laid-Open Application DOS No. 2,308,791, to apply metallic cobalt to magnetite and treat the resulting coated particles in an inert atmosphere at from 100° to 600° C.

Most cobalt-modified acicular iron oxides do not have entirely satisfactory magnetic properties and suffer from thermal and/or mechanical instability. The desired high coercive force is in most cases only achieved by means of a relatively high cobalt content, which then leads to the known disadvantages. Reducing the amount of cobalt and at the same time increasing the treatment temperature does not give products which, when used in magnetic recording media, conform to the expected requirements.

It is an object of the present invention to provide a simple and economical method of manufacturing a cobalt-modified gamma-iron(III) oxide suitable for use as magnetizable material in magnetic recording media which, although having a very low cobalt content, gives a very high coercive force, whilst the effect of temperature on the coercive force and residual induction is very slight, and which, when employed for the manufacture of magnetic recording media, gives products distinguished by high maximum output levels at long and short wavelengths and good stability to thermal and mechanical factors.

We have found that this object is achieved and that acicular magnetic iron oxides containing from 0.5 to 10 percent by weight of cobalt and up to 24 percent by weight of divalent iron, each based on the amount of iron(III) oxide, which meet the above requirements are obtained if an aqueous suspension of gamma-iron(III) oxide, containing cobalt(II) and iron(II) ions, the suspension having a hydroxyl ion concentration of more than $3.16 \times 10^{-6}$ moles/liter, is heated at from 50° to 100° C. for at least 15 minutes, and the resulting precipitate is filtered off, washed until neutral, dried at below 100° C. and thereafter heated at from 100° to 200° C.

Suitable starting materials for the process according to the invention are the gamma-iron(III) oxides manufactured by conventional methods and intended for use in the manufacture of magnetic recording media. Such iron oxides consist of acicular particles with a length of from 0.2 to 1 $\mu$m, preferably from 0.3 to 0.8 $\mu$m, and a length-to-width ratio of from 20:1 to 5:1. These particles are obtained by converting acicular hydrated iron(III) oxide to magnetite in a reducing atmosphere and then oxidizing the magnetite to gamma-iron(III) oxide at below 400° C. If desired, a heat treatment can be carried out before or after the reduction, in order to improve the mechanical and magnetic properties. It is also possible to treat the various iron oxide intermediates, during manufacture of the gamma-iron(III) oxide, with inorganic or organic substances, for example to retain the shape of the particles, and such a treatment may prove advantageous in special cases.

A gamma-iron(III) oxide suitable for the process according to the invention can also be manufactured by coating an acicular non-magnetic iron oxide or hydrated iron oxide with a higher hydrocarbon, higher alcohol or amine, or a fatty acid or its salts and carrying out the conversion of the oxide in air at from about 400° to 650° C.

For the purposes of the invention, it is also advantageous to employ a gamma-iron(III) oxide which already contains less than 24 percent by weight of divalent iron. This iron(II) content is achieved in the conventional manner by partially oxidizing magnetite or by partially reducing gamma-iron(III), in each case under mold conditions, ie., above all, at a low conversion temperature.

To carry out the process according to the invention, the said gamma-iron(III) oxide is suspended, by vigorous stirring, in an aqueous medium containing cobalt(II) ions and iron(II) ions, the OH ion concentration is brought to a value greater than $3.16 \times 10^{-6}$ moles/liter by adding a base, in order to precipitate the metal hydroxides, and the mixture is then heated for at least 15 minutes, and usually for from 30 to 90 minutes, at from 50° to 100° C. It has proved particularly advantageous first to suspend the gamma-iron (III) oxide in water, bring the pH to neutral and pass nitrogen through the suspension whilst heating it at from 50° to 100° C. The aqueous cobalt salt solution and the base, usually in the form of an alkali metal hydroxide, are then added. The amount of cobalt salt added depends on the amount of cobalt which is desired in the end product and which should be from 0.5 to 10 percent by weight. The amount of base added is at least that which is required to precipitate the cobalt ions as cobalt hydroxide. It is advantageous to add the entire amount of base required to achieve an OH ion concentration of at least $3.16 \times 10^{-6}$ moles/liter and then to introduce the iron(II) salt solution into the suspension. The amount of the said solution depends on the content of iron(II) desired in the end product after the suspension has been heated.

After filtering, the solid is washed. The filter cake is dried at below 100° C., usually under slightly reduced pressure. The powder obtained is then heated at from 100° to 200° C., preferably from 120° to 180° C. Adherence to this temperature range is very important for the success of the process according to the invention. If the product is heated under an inert gas, in general nitrogen, in order to avoid oxidation, particularly high coercive force, residual induction and saturation magnetization values are achieved. The iron (II) content in the end product is then the sum of the iron(II) present in the gamma-iron(III) oxide employed and the iron(II) formed in the course of the process of the invention. We have found that the total iron (II) content in the product may be up to 24 percent by weight. However, in the process variant in which heating is carried out under an inert gas, it is necessary to ensure that the product does not oxidize during the prior drying. This precaution is not necessary if heating is carried out in an oxygen-containing atmosphere, since here partial or complete oxidation of the iron(II) present occurs in any case, the extent depending on the partial pressure of oxygen.

The gamma-iron(III) oxides modified by the process according to the invention exhibit a number of improvements over prior art products. Thus, in spite of a relatively low cobalt content, they exhibit, depending on how the process is carried out, a very high coercive force, though the temperature dependence of both the latter and the residual induction is in every case very low. This temperature dependence is expressed in terms of the TA value, namely the sum of the quotient of the coercive force at −100° C. to that at +25° C. and the quotient of the relative remanence $M_R/M_S$ at −100° C. to that at +25° C. This TA value must be less than 3.5; if it is higher, then, in spite of improved coercive force and residual induction values, the thermal and magnetic stability and the orientation ratio of the magnetic recording media produced with such materials will be unsatisfactory. Furthermore, the products manufactured by the process according to the invention have a very narrow field strength distribution.

Furthermore, magnetic recording media having a particularly high orientation ratio can be obtained with the products manufactured according to the invention. An additional advantage is that in the case of the magnetic iron oxides improved by the process according to the invention certain properties of the starting material, for example the mechanical strength of the particles and the electroacoustic noise characteristics, remain essentially unaltered by the subsequent treatment, so that, in addition to having the advantages resulting from the process according to the invention, the end product can be provided with further particularly favorable properties as a result of appropriate choice of the starting materials.

The invention is illustrated by the following Examples which refer to Figures which show the dependence of the coercive force and the relative remanence on the temperature.

The magnetic properties, namely the coercive force $H_c$ [kiloamps/m], the specific remanence $M_R/\zeta$ [nTm$^3$/g] and the specific saturation magnetization $M_S/\zeta$ [nTm$^3$/g], of the powder samples were measured in a vibrating sample magnetometer at a field strength of 160 kiloamps/m. Where the field strength used for the measurements was, instead, 800 kiloamps/m, this is indicated in the particular Examples.

To characterize the field strengths of the individual particles, the value $h_5$ for the total width of the residual induction curve and the value $h_{25}$ for the slope of the residual induction curve are determined from the d.c. demagnetization curve. The values are determined from the following equations:

$$h_5 = \frac{H_{95} - H_5}{H_R} \text{ and}$$

$$H_{25} = \frac{H_{75} - H_{25}}{H_R}$$

The subscript following the letter H indicates what percentage of the particles has been reverse-magnetized.

The magnetic orientability of the particles was determined by means of a preliminary test and quoted as the $RF_E$. For this test, about 1 g of the magnetic powder is introduced into a two-component epoxy resin, so that the proportion by volume of the magnetic powder is about 10%. The powder is thoroughly mixed with the two-component resin between counter-rotating sheets of glass and the mixture is then spread in a thin layer and cured at 70° C. in a uniform magnetic field of 800 kiloamps/m. This results in different degrees of orientation of the magnetic particles parallel to the magnetic field, the degree depending on their process of manufacture. This orientation is measured in terms of the orientation ratio $RF_E$, namely the quotient of the residual induction along, and crosswise to, the direction of orientation.

To measure the temperature dependence of the coercive force and of the relative remanence and to determine the TA value, the powder samples were examined in a field of 800 kiloamps/m over the temperature range from $-100°$ to $+140°$ C., in each case carrying out a heating and cooling cycle.

EXAMPLE 1

3,000 g of gamma-iron(III) oxide are stirred into 30 l of water in a stirred kettle equipped with a reflux condenser. The pH is then brought to 7 with 0.5-normal NaOH. The batch is heated to 50° C. and is gassed with nitrogen for one hour, after which 429 g of $CoSO_4 . 6 H_2O$ dissolved in 3 l of water, and 1,227 g of NaOH in 3 l of water, are added. Whilst continuing to stir the mixture vigorously, 1,155 g of $FeSO_4 . 7 H_2O$ in 6.93 l of 0.1-normal $H_2SO_4$ are added dropwise in the course of 20 minutes. The batch is now heated to 80° C. and maintained at this temperature for 1.5 hours. When it has cooled, it is filtered and the filter cake is washed until the filtrate gives a neutral reaction. The filter cake is then divided into two halves. Part A is dried at 60° C. under reduced pressure (about 100 mm Hg). After taking a sample A 1, part A is divided into three portions which are heated for two hours under nitrogen at 100° C. (sample A 2), at 130° C. (sample A 3) and at 150° C. (sample A 4) respectively. Part B is also divided up. Part B 1 is heated in a rotary furnace, whilst passing nitrogen over the material, in such a way that the maximum temperature of the product is 100° C. After completion of the drying operation, the temperature is raised to 130° C. and maintained at this level for one hour. Part B 2 is treated similarly except that the heat treatment temperature is increased to 150° C.

The measurements obtained are shown in Table 1.

EXAMPLE 2

3,000 g of gamma-iron(III) oxide, prepared as described in German Published Application DAS 1,204,644, are stirred into 30 l of water. The pH is then brought to 7 with 0.5-normal NaOH and the batch is heated to 50° C. with vigorous stirring and nitrogen gassing. After one hour, 286 g of $CoSO_4 . 6 H_2O$ dissolved in 3 l of water and 1,227 g of NaOH dissolved in 3 l of water are added. 1,155 g of $FeSO_4 . 7 H_2O$ in 6.93 l of 0.1-normal $H_2SO_4$ are then added dropwise in the course of 20 minutes. The batch is heated to 90° C. and kept at this temperature for 1.5 hours. When it has cooled, it is filtered and the product washed until the filtrate shows a neutral reaction. The product is worked up as described in Example 1, the various samples being designated C 1 to C 4 and D 1 to D 2, corresponding to A 1 to A 4 and B 1 to B 2. The measurements obtained are shown in Table 2.

COMPARATIVE EXPERIMENT 1

Goethite, prepared as described in German Published Application DAS 1,204,644, is reduced to magnetite in a stream of hydrogen at 320° C. and the latter is reoxidized to gamma-iron(III) oxide in air at 250° C. This product is suspended in water. An amount of cobalt corresponding to 3 percent by weight is applied to the iron oxide by adding a cobalt sulfate solution and then precipitating cobalt hydroxide by means of 0.5-normal NaOH at a pH of 11. The solid containing gamma-iron(III) oxide and cobalt hydroxide is filtered off, washed until the filtrate shows a neutral reaction, and heated for 20 hours at 200° C. This sample is designated E. The measurements obtained are shown in Table 2.

COMPARATIVE EXPERIMENT 2

Goethite is modified with cobalt hydroxide using the method described in Comparative Experiment 1. The solid mixture is filtered off, washed and dried at 100° C. under 100 mm Hg. It is then reduced in a stream of hydrogen at 320° C. to give cobalt-modified magnetite, which is reoxidized at 250° C. The end product is designated F and the measurements obtained are also shown in Table 2.

TABLE 1

| Example 1 Sample | $\rho \left[\frac{g}{cm^3}\right]$ | $M_s/\rho \left[\frac{nTm^3}{g}\right]$ | $M_r/\rho \left[\frac{nTm^3}{g}\right]$ | $M_r/M_s$ | $H_c$ (tap density $\rho$ = 1.2 g/cm³) [kiloamps/m] | $Fe^{2+}$ Content [%] | $h_5/h_{25}$ | TA value | $RF_E$ |
|---|---|---|---|---|---|---|---|---|---|
| A 1 | 0.96 | 86 | 45 | 0.52 | 37.6 | 3.8 | 1.53/0.54 | 2.6 | 2.6 |
| A 2 | 1.13 | 80 | 42 | 0.53 | 40.4 | 3.6 | 1.48/0.48 | 2.9 | 4.3 |
| A 3 | 1.11 | 81 | 43 | 0.53 | 41.5 | 3.6 | 1.34/0.46 | 3.4 | 4.1 |
| A 4 | 1.09 | 80 | 43 | 0.54 | 41.8 | 3.6 | 1.38/0.47 | 3.0 | 4.1 |
| B 1 | 1.29 | 82 | 44 | 0.54 | 44.2 | 5.6 | 1.42/0.48 | 3.1 | 4.5 |
| B 2 | 1.21 | 80 | 44 | 0.55 | 47.3 | 5.6 | 1.42/0.48 | 3.2 | 3.8 |

TABLE 2

| | $M_s/\rho$ [nTm³/g] | $M_r/\rho$ [nTm³/g] | $M_r/M_s$ | $H_c(\rho = 1.2$ g/cm³) [kiloamps/m] | TA value | $Fe^{2+}$ content [%] |
|---|---|---|---|---|---|---|
| Example 2: | | | | | | |
| C 1 | 87 | 45 | 0.52 | 37.3 | | 4.8 |
| C 2 | 82 | 41 | 0.50 | 36.9 | | 4.8 |
| C 3 | 78 | 48 | 0.62 | 38.9 | | 4.6 |
| C 4 | 87 | 46 | 0.53 | 41.4 | | 4.6 |
| D 1 | 91 | 48 | 0.53 | 41.5 | 2.6 | 5.9 |
| D 2 | 88 | 46 | 0.52 | 43.3 | 2.6 | 6.0 |
| Comparative Experiment 1: | | | | | | |
| E | 82 | 40 | 0.49 | 29.5 | 2.3 | <0.2 |
| Comparative Experiment 2: | | | | | | |

TABLE 2-continued

| | $M_s/\rho$ [nTm³/g] | $M_r/\rho$ [nTm³/g] | $M_r/M_s$ | $H_c(\rho = 1.2$ g/cm³) [kiloamps/m] | TA value | $Fe^{2+}$ content [%] |
|---|---|---|---|---|---|---|
| F | 75 | 39 | 0.52 | 37.0 | 4.3 | <0.2 |

The results of the measurements are also shown in Table 4.

TABLE 4

| Example 4 Sample | NaOH parts | FeSO₄ . 7H₂O parts | $M_s/\rho$ [nTm³/g] | $M_r/\rho$ [nTm³/g] | $M_r//M_s$ | $H_c(\rho = 1.2$ g/cm³) [kiloamps/m] |
|---|---|---|---|---|---|---|
| I (1) | 40 | 38.5 | 80 | 48 | 0.53 | 41.8 |
| I (2) | | | 85 | 44 | 0.52 | 36.4 |
| K (1) | 41.5 | 64.1 | 92 | 49 | 0.53 | 41.9 |
| K (2) | | | 88 | 46 | 0.52 | 36.5 |
| L (1) | 40.6 | 25.0 | 87 | 45 | 0.52 | 38.3 |
| L (2) | | | 87 | 44 | 0.51 | 32.8 |

EXAMPLE 3

3,000 g of a gamma-iron(III) oxide prepared as described in Example 2 are stirred into 30 l of water. 285 g of CoSO₄ . 6 H₂O in 3 l of water and 1,200 g of NaOH in 3 l of water are then added whilst passing nitrogen into the mixture. A solution of 750 g of FeSO₄ . 7 H₂O in 4.5 l of 0.1-normal H₂SO₄ is then added dropwise in the course of 20 minutes. The mixture is heated to 80° C., kept at this temperature for one hour, then allowed to cool and filtered, and the filter cake is washed with water until the filtrate gives a neutral reaction, and is dried at 60° C. under 100 mm Hg. The product is divided into two samples G and H, the latter being heated under the conditions shown in Table 3. The magnetic values shown in Table 3 were measured in a field of 800 kiloamps/m.

TABLE 3

| Example 3 Sample | Temp. °C. | Time h | $M_s/\rho$ [nTm³/g] | $M_r/\rho$ [nTm³/g] | $M_r/M_s$ | $H_c (\rho = 1.2$ g/cm³) [kiloamps/m] |
|---|---|---|---|---|---|---|
| G | — | — | 99 | 44 | 0.43 | 37.8 |
| H | 130 | 2 | 103 | 44 | 0.43 | 39.9 |

EXAMPLE 4

100 parts of gamma-iron(III) oxide are stirred into 1,000 parts of water whilst gassing with nitrogen. 9.5 parts of CoSO₄ . 6 H₂O in 100 parts of water are added, followed by the amount of NaOH shown in Table 4, in each case dissolved in 100 parts of water, and thereafter the amount of FeSO₄ . 7 H₂O also shown in Table 4, dissolved in 231 parts of 0.1-normal H₂SO₄, is added in the course of 20 minutes; samples I, K and L are obtained. These are then heated at 80° C., allowed to cool after one hour, and filtered; the products are washed until they give a neutral reaction and each is divided into two parts. One part (1) is dried under nitrogen in such a way that the product temperature does not exceed 100° C. and, after completion of drying, is heated for two hours under nitrogen at 130° C. The other part (2) is merely dried at 60° C. under 100 mm Hg.

EXAMPLE 5

A powder sample is prepared in the same way as the Example 4/L sample, except that drying is carried out at 40° C. under 100 mm Hg; this is sample M. This sample is then heated under nitrogen for 2 hours at 130° C., giving sample N. The results are shown in Table 5.

TABLE 5

| Example 5 Sample | $M_s/\rho$ [nTm³/g] | $M_r/\rho$ [nTm³/g] | $M_r/M_s$ | $H_c(\rho = 1.2$ g/cm³) [kiloamps/m] |
|---|---|---|---|---|
| M | 88 | 46 | 0.52 | 37.1 |
| N | 88 | 46 | 0.52 | 40.4 |

EXAMPLE 6

3,000 g of gamma-iron(III) oxide are treated as described in Example 1. After washing, the batch is divided into four parts. Three parts are heated in a rotary furnace, whilst passing nitrogen over the material, in such a way that the maximum product temperature is 100° C. After completion of drying, the temperature is raised to 130° C. (sample O), 150° C. (sample P) and, for comparison, 300° C. (sample Q). The fourth part is heated in a rotary furnace, whilst passing air over the material, in such a way that the maximum product temperature is 100° C. After completion of drying, the temperature is raised to 150° C. (sample R).

Table 6 shows the magnetic properties and the orientation ratio $RF_E$ of the samples obtained.

TABLE 6

| Example 6 Sample | $M_s/\rho$ nTm³/g | $M_r/\rho$ nTm³/g | $M_r/M_s$ | $H_c(\rho = 1.2$ g/cm³) [kiloamps/m] | TA value | FIG. | $RF_E$ |
|---|---|---|---|---|---|---|---|
| O | 82 | 43 | 0.52 | 41.0 | 2.94 | 1 | 5.4 |
| P | 81 | 44 | 0.54 | 44.4 | 3.09 | | 5.4 |
| Q | 75 | 51 | 0.68 | 63.7 | 3.95 | 2 | 1.6 |
| R | 79 | 39 | 0.49 | 28.7 | 2.66 | 3 | |

EXAMPLE 7

Magnetic pigment dispersions are prepared using a magnetic material according to the invention, prepared as described in Example 1, sample A2, and a prior art material, prepared as described in Comparative Experiment 2; magnetic tapes are then prepared with these dispersions (Tape I and Tape II respectively).

To prepare each magnetic dispersion, a ball mill is charged with 8,000 parts of steel balls of 5 mm diameter, followed by 700 parts of the particular magnetic material, 420 parts of a mixture of equal parts of tetrahydrofuran and dioxane, 8.75 parts of lecithin, 8.75 parts of a neutral polyaminoamide salt and 210 parts of a 20% strength solution of a copolymer of 80% of vinyl chloride, 10% of dimethyl maleate and 10% of diethyl maleate (K value 58) in a mixture of equal parts of tetrahydrofuran and dioxane.

The mixture is dispersed for 40 hours. 1,090 parts of a 10% strength solution of a thermoplastic polyesterurethane, obtained from adipic acid, 1,4-butanediol and 4,4'-diisocyanatodiphenylmethane, in a mixture of equal parts of tetrahydrofuran and dioxane, and 0.7 part of polydimethylsiloxane, are then added. After dispersing for a further 5 hours, the magnetic dispersion obtained is filtered under pressure through a filter having a pore size of 5 μm. Using a knife coater, a 6 μm polyethylene terephthalate film is coated with the magnetic dispersion in the conventional manner, and after passing through a magnetic field the coating is dried at from 60 to 100° C. After drying, the magnetic coating on the film is 5 μm thick. The coated film is calendered by passing it between heated rollers (80° C., under a nip pressure of about 3 kg/cm). The coated film is then cut into tapes of the conventional width, eg. 6.25 and 3.81 mm for audio tapes.

The electro-acoustic properties, namely the maximum output level at long wavelengths, $A_T$, ie. the maximum tape flux which is obtained at a recording frequency of 333 Hz and a cubic distortion of 5%, and the maximum output level at short wavelengths, $A_H$, ie. the maximum tape flux which is obtained at a recording frequency of 10 kHz, of magnetic tape I, containing the magnetic material corresponding to sample A2 of Example 1, were measured substantially in accordance with DIN 45,512; this magnetic tape I was compared with Reference Tape II (OdB). Table 7 shows the results of the measurements.

TABLE 7

| | | I | II |
|---|---|---|---|
| Magnetic material: | $H_c(\rho = 1.2 \text{ g/cm}^3)$ [kiloamps/m] | 40.2 | 39.5 |
| | TA value | 2.9 | 4.1 |
| Magnetic tape: | $H_c$[kiloamps/m] | 44.8 | 36.4 |
| | residual induction [mT] | 159 | 129 |
| | $A_H$[dB] | +3.7 | 0 |

TABLE 7-continued

| | I | II |
|---|---|---|
| $A_T$[dB] | +2.4 | 0 |

We claim:

1. A method of preparing acicular magnetic iron oxide particles, said particles being modified with 0.5 to 10 percent by weight of cobalt and up to 24 percent by weight of divalent iron, each based on the amount of iron oxide, which comprises the steps of
   (a) suspending acicular gamma-iron(III) oxide in water and bringing the pH of the suspension to neutral,
   (b) passing nitrogen into the suspension while heating it at a temperature of from 50 to 100° C.,
   (c) adding to the suspension an aqueous solution of a cobalt(II) salt and a base in an amount required to achieve an hydroxyl ion concentration of at least $3.16 \times 10^{-6}$ moles/liter,
   (d) introducing into the suspension an aqueous solution of an iron(II) salt,
   (e) heating said suspension for at least 15 minutes at a temperature of from 50 to 100° C., said suspension having a hydroxyl ion concentration greater than $3.16 \times 10^{-6}$ moles/liter,
   (f) filtering off and washing the resulting precipitate until neutral,
   (g) drying the precipitate at below 100° C., and
   (h) heating the dried precipitate at from 100 to 200° C. until a TA value less than 3.5 is obtained.

2. A method of preparing acicular magnetic iron oxide particles, said particles being modified with 0.5 to 10 percent by weight of cobalt and up to 24 percent by weight of divalent iron, each based on the amount of iron oxide, which comprises the steps of
   (a) suspending acicular gamma-iron(III) oxide in water and bringing the pH of the suspension to neutral,
   (b) passing nitrogen into the suspension while heating it at a temperature of from 50 to 100° C.,
   (c) adding to the suspension an aqueous solution of a cobalt(II) salt and a base in an amount required to achieve a hydroxyl ion concentration of at least $3.16 \times 10^{-6}$ moles/liter,
   (d) introducing into the suspension an aqueous solution of an iron(II) salt,
   (e) heating said suspension for at least 15 minutes at a temperature of from 50 to 100° C., said suspension having a hydroxyl ion concentration greater than $3.16 \times 10^{-6}$ moles/liter,
   (f) filtering off and washing the resulting precipitate until neutral,
   (g) drying the precipitate at below 100° C. while avoiding oxidation, and
   (h) heating the dried precipitate at from 100 to 200° C. under an inert gas until a TA value less than 3.5 is obtained.

* * * * *